United States Patent [19]

South, Jr.

[11] E Re. 31,436

[45] Reissued Nov. 1, 1983

[54] THERMOSETTING POLYESTER COMPOSITION CONTAINING NORMALLY SOLID CARBOXY-CONTAINING DIENE POLYMER

[75] Inventor: Aubrey South, Jr., Bartlesville, Okla.

[73] Assignee: Phillips Petroleum Company, Bartlesville, Okla.

[21] Appl. No.: 814,066

[22] Filed: Jul. 8, 1977

Related U.S. Patent Documents

Reissue of:

[64] Patent No.: 4,020,036
Issued: Apr. 26, 1977
Appl. No.: 679,284
Filed: Apr. 22, 1976

[51] Int. Cl.[3] ..... C08L 67/06

[52] U.S. Cl. ..... 523/514; 523/521; 523/523

[58] Field of Search ..... 260/40 R, 862; 524/513, 524/426, 399, 436, 394, 433, 505; 525/171; 523/514, 521, 523

[56] References Cited

U.S. PATENT DOCUMENTS

| | | | |
|---|---|---|---|
| 3,231,634 | 1/1966 | Wismer | 260/862 |
| 3,242,129 | 3/1966 | Wilder | 260/31.8 |
| 3,766,129 | 10/1973 | Pesez | 260/40 R |
| 3,806,490 | 4/1974 | Kajiura et al. | 260/40 R |
| 3,857,812 | 12/1974 | Nowak et al. | 260/40 R |
| 3,882,078 | 5/1975 | Kubata | 260/862 X |
| 3,925,272 | 12/1975 | Ibata et al. | 260/4 |
| 3,989,769 | 11/1976 | Bonnington | 260/40 R X |
| 3,998,909 | 12/1976 | Roberts et al. | 260/40 R X |

FOREIGN PATENT DOCUMENTS

| | | |
|---|---|---|
| 979128 | 12/1975 | Canada . |
| 1953062 | 5/1970 | Fed. Rep. of Germany . |
| 2225736 | 1/1973 | Fed. Rep. of Germany . |
| 5833 | 9/1975 | France . |
| 49-54489 | 5/1974 | Japan . |
| 50-114490 | 9/1975 | Japan . |
| 51-52488 | 5/1976 | Japan . |
| 1276198 | 6/1972 | United Kingdom . |
| 1396894 | 6/1975 | United Kingdom . |
| 1396895 | 6/1975 | United Kingdom . |

*Primary Examiner*—Lewis T. Jacobs

[57] ABSTRACT

A thermosettable composition suitable for preparing reinforced plastic articles is prepared by combining an unsaturated polyester, a normally solid carboxy-containing polymer of a conjugated diene, a vinyl monomer, a catalyst and a reinforcing agent or filler. Preferably the composition is prepared utilizing a mixer giving moderate shear such as a twin-rotor mixer. The resulting composition when cured exhibits high impact strength and good surface finish.

16 Claims, No Drawings

THERMOSETTING POLYESTER COMPOSITION CONTAINING NORMALLY SOLID CARBOXY-CONTAINING DIENE POLYMER

Matter enclosed in heavy brackets [ ] appears in the original patent but forms no part of this reissue specification; matter printed in italics indicates the additions made by reissue.

BACKGROUND OF THE INVENTION

This invention relates to unsaturated polyester compositions containing a polymer of a conjugated diene.

It is known in the art to produce unsaturated polyester compositions containing rubber. However, it has been found that such compositions tend to exhibit separation when combined with a reinforcing agent or filler, thus impairing the physical properties, particularly impact strength.

Liquid or semi-solid rubbers which can simply be mixed with polyesters to produce thermosetting compositions are also well known and a broad spectrum of low molecular weight liquid or semi-solid rubbers are suggested in the art for use in such compositions. However, low molecular weight rubber compositions tend to give very poor surface finish in systems containing a reinforcing agent or filler.

SUMMARY OF THE INVENTION

It is an object of this invention to provide a thermosetting polyester composition having good impact strength and good surface characteristics;

It is a further object of this invention to provide a molded article having improved pigmentability.

It is still a further object of this invention to provide a cured thermoset article; and it is yet a further object of this invention to provide a method for producing a polyester composition containing a normally solid polymer of a conjugated diene capable of giving high strength articles having good surface characteristics.

In accordance with this invention there is provided a composition comprising an unsaturated polyester and a normally solid carboxy-containing polymer of a conjugated diene in a composition also containing a vinyl monomer, a catalyst and a reinforcing agent or filler.

DESCRIPTION OF THE PREFERRED EMBODIMENTS

This invention concerns thermosetting composition comprising an unsaturated polyester, a normally solid carboxy-containing a polymer of a conjugated diene, a vinyl monomer, a catalyst and one or more reinforcing agents or fillers.

The unsaturated polyesters are prepared by reacting an unsaturated dicarboxylic acid having 4 to 12 carbon atoms such as maleic, fumaric, itaconic, citraconic, mesaconic (or anhydrides or acid halides thereof), cis-2-dodecenedioc acid and mixtures thereof with one or more polyols. Representative polyols that can be used include alkylene glycols having 2–10 carbon atoms, dialkylene glycols having 4–18 carbon atoms, glycerol, pentaerythritol, trimethylolpropane, trimethylpentanediol, trimethylpropanediol and hydrogenated bisphenol-A.

Up to one-half or more on a molar ratio of the unsaturated acid can be replaced by one or more saturated polycarboxylic acids having from 2–12 carbon atoms to modify the degree of unsaturation and reactivity of the polyester. Illustrative of these are oxalic acid, malonic acid, succinic acid, methylsuccinic acid, glutaric acid, adipic acid, suberic acid, sebacic acid, the phthalic acids, naphthalene dicarboxylic acid, cyclohexane dicarboxylic acid, citric acid and the like and mixtures thereof.

The proportion of polyhydric alcohols having more than two hydroxy groups such as glycerol, pentaerythritol, etc. and the proportion of polycarboxylic acids having more than two carboxy groups such as citric acid is preferably less than about 5 mole percent each based on total amount of polyol and polycarboxylic acid respectively so that a polyester is obtained with maximum esterification of the hydroxy and carboxy groups without being so viscous that difficulty would be experienced during subsequent compounding.

The carboxy-containing solid polymers of conjugated dienes of this invention are known polymers. Carboxy terminated polymers, for example, are described in U.S. Pat. Nos. 3,135,716 (Uraneck et al, June 1964) and 3,242,129 (Wilder, March 1966), the disclosures of which are hereby incorporated by reference. The resulting polymers generally have a carboxyl content in the range of about 0.01 to 5 weight percent. The polymers of conjugated dienes for use in this invention are normally solid and generally have a weight average molecular weight of 30,000 to 400,000 or higher, preferably 50,000 to 250,000. In terms of inherent viscosity, the ranges encompassed are from about 0.4 to 3, more preferably from about 0.6 to 2. Inherent viscosity is determined using 0.1 gram per 100 ml of toluene at 25° C.

The diene addition in the polymers of conjugated dienes can be in the 1, 2 mode or the 1, 4 mode or combinations thereof. The unsaturation microstructure of the polymers is generally in the range of from about 5 to 76 percent vinyl, from about 5 to 60 percent trans and from about 15 to 50 percent cis unsaturation.

The polymers of this invention include the homopolymers and copolymers of the conjugated dienes. Also included are copolymers of the conjugated dienes and a monovinyl-substituted aromatic hydrocarbon containing from about 8–18 carbon atoms per molecule. Examples of the monovinyl-substituted aromatic monomer include: styrene, 3-methylstyrene, 4-n-propylstyrene, 4-cyclohexylstyrene, 4-docecylstyrene [] *dodecylstyrene* 2-ethyl-4-benzylstyrene, 4-(4-phenyl-n-butyl)sytrene, 1-vinylnaphthalene, 2-vinylnaphthalene, t-butylstyrene and the like. The monovinyl-substituted aromatic hydrocarbon can contain alkyl, cycloalkyl, and aryl substituents, and combinations thereof such as alkylaryl in which the total number of carbon atoms in the combined substituents is generally not greater than 12. Styrene is presently preferred because of its availability and effectiveness. The polymerized conjugated diene content of these [copolymers] *polymers* ranges from about 20 to 100 weight percent, more preferably from about 55 to 100 weight percent.

Although the presently preferred conjugated diene is 1,3-butadiene, it is within the scope of the carboxy-containing polymers of this invention to use conjugated dienes containing from 4–12 carbon atoms per molecule, more preferably from 4–8 carbon atoms per molecule. Examples of such compounds include 1,3-butadiene, isoprene, 2,3-dimethyl-1,3-butadiene, piperylene, 3-butyl-1,3-octadiene, 1-phenyl-1,3-butadiene, and the like and mixtures thereof.

The conjugated diene-monovinyl-substituted aromatic hydrocarbon copolymers can be of random or block configuration or combinations thereof. Block polymers are presently preferred.

The polymers of conjugated dienes of this invention can be prepared according to previously cited patents and by free radical polymerization in solution, suspension or emulsion processes. For example, polymerization can be initiated with carboxy-containing compounds such as azobis-cyanopentanoic acid, di(β-carboxypropionyl)peroxide (succinic acid peroxide) and the like. Chain transfer agents such as thioglycolic acid and the like are used to regulate the molecular weight of the polymer produced in such processes.

It is within the scope of preparing the carboxy-containing polymers of conjugated dienes to react polymers such as hydroxy terminated polymers with an anhydride of an unsaturated dicaboxylic acid such as maleic anhydride, citraconic anhydride, [] *anhydride* itaconic anhydride, chloromaleic anhydride and the like to produce polymers with attached groups terminated with a carboxy group. Other carboxy containing diene polymers can be prepared in emulsion systems incorporating reactive unsaturated carboxylic acid monomers.

Also diene polymers can be modified with peroxide and unsaturated reactive carboxylic acids or thio [containing ] *containing* carboxylic acids to give carboxy containing polymers.

The ratio of unsaturated polyester to carboxy-containing polymer of a conjugated diene generally ranges from about 15:1 to 0.5:1, preferably from about 5:1 to 1:1.

Representative vinyl monomers include styrene, vinyltoluene, divinylbenzene, 2-vinylpyridine, diallyl phthalate, triallyl isocyanurate, α-methylstyrene, alkyl acrylates and alkyl methacrylates in which the carbon atoms in the alkyl groups range from 1 to about 6 and the like and mixtures thereof. The presently preferred vinyl monomer is styrene because of its availability, reactivity, cost and desirable properties. Total vinyl monomer from all sources is 15 to 300, preferably 30 to 200 parts by weight vinyl monomer per 100 parts by weight polyester plus polymer of a conjugated diene.

The catalysts used in this invention are conventional free radical polymerization initiators selected from among organic peroxides and hydroperoxides such as benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate and the like. In addition, azo compounds such as azobis-isobutyronitrile can be employed. A presently preferred catalyst is t-butyl perbenzoate. The catalyst is generally used in the range from about 0.1 to 10 parts by weight per 100 parts by weight polyester plus carboxy-containing polymer of a conjugated diene, more preferably from about 1-5 parts by weight catalyst.

The reinforcing agents used in this invention comprise fibers selected from among glass, asbestos, carbon, graphite, metal, synthetic polymers such as polyamides, polyester, polyolefins and the like and natural fibers such as cotton, jute, hemp, sisal, flax, wood, paper and the like. A presently preferred fiber is glass. The fibers can be used in the form of mats, fabrics, threads, chopped fiber and the like. The quantity of reinforcing agent is generally used in the range from about 20 to 300 parts by weight per 100 parts by weight polyester plus carboxy-containing polymer of a conjugated diene, more preferably from about 40 to 200 parts by weight reinforcing agent.

Desirably, from about 0.2 to 20 parts by weight, preferably from about 1 to 10 parts by weight per 100 parts by weight of polyester plus carboxy-containing polymer of a conjugated diene of an oxide or hydroxide of a Group II metal are added to the compositions of this invention. Exemplary of such compounds are the oxides and hydroxides of magnesium, calcium, strontium, barium and zinc. The compounds provide a thickening function.

In addition to the previously named components of the compositions of this invention other optional additives can be used. These include fillers, pigments, colorants, lubricants, stabilizers, silane coupling agents and the like. Fillers include calcium carbonate, calcium silicate, talc, clay, alumina, aluminum hydroxide, antimony trioxide, silica, mica, barium sulfate, calcium sulfate, and the like and mixtures thereof. Presently preferred fillers include calcium carbonate, clay and talc because of availability and cost. The quantity of filler, when used, is generally used in the range of from about 50 to 1000 parts by weight per 100 parts by weight polyester plus carboxy-containing polymer of a conjugated diene, more preferably from about 200 to 800 parts by weight filler.

A lubricant such as aluminum, barium, calcium, magnesium or zinc stearate and the like in the range of from about 0.2 to 20 parts by weight, more preferably from about 1 to 15 parts by weight per 100 parts by weight carboxy-containing polymer of a conjugated diene plus polyester can be used to impart mold release properties to the compositions.

A stabilizer such as a barium or cadmium soap, a tin compound such as tin octanoate, a phosphite such as dimethyl phosphite, tris(nonylphenyl)phosphite, alkyl phenols such as BHT, quinones, amines, and the like can be employed in an amount ranging from about 0.02 to 5 parts by weight per 100 parts by weight polyester plus carboxy-containing polymer of a conjugated diene.

Conventional colorants and pigments such as $TiO_2$, carbon black, phthalocyanine pigments and the like, and mixtures thereof, are employed as desired in amounts sufficient to give the desired color to the final molded product. The compositions of this invention possess outstanding pigmentability and smoothness. The ingredients are incorporated by a milling technique which involves moderate shear. This can be accomplished by means of twin-rotor mixtures designed to give moderate shear to the paste-like ingredients. It is essential to provide some shear and because of the viscosity of the materials being mixed, proper mixing cannot be obtained simply by stirring or by using a conventional impeller mixer. On the other hand, high intensity mixing which would generate excessive heat and activate the catalyst must be avoided also. Sheet molding compounding line mixing equipment can also be used. This mixing under sufficient shear to achieve good dispersion of the ingredients without heat buildup sufficient to activate the catalyst insures a good blend and is necessitated by the fact that the polymer of the conjugated diene is a normally solid material as opposed to a liquid or semi-solid. Shear which gives a heat build-up of 1-50, preferably 2°-30° C. is satisfactory.

The curing can be done at a temperature known in the art for the particular catalyst utilized. Generally a temperature of 100° to 200° C. and a time of 1 to 15 minutes in a press is sufficient.

EXAMPLE

Thermosetting compositions were prepared using a variety of butadiene rubbers, some being carboxy-terminated and a commercially available unsaturated polyester resin (3702-5, Koppers Co.). The polyester was essentially a 0.9:1 mole ratio fumaric acid/propylene glycol resin with some maleic acid units as indicated by nuclear magnetic resonance analysis.

Each composition was prepared by mixing a solution of the rubber dissolved in styrene with about ¼ of the calcium carbonate filler in a Baker-Perkins sigma mixer for 5 minutes. The remaining calcium carbonate was then added and mixed an additional 5 minutes. A mixture of the polyester resin dissolved in styrene, magnesium hydroxide thickener, zinc stearate mold release agent and t-butyl perbenzoate catalyst which had been premixed was then added and mixed for 15 minutes. The chopped fiber glass reinforcing agent was added in 2 increments to the mixture and mixing was continued an additional 10 minutes. Plaques, measuring 6 inches ×6 inches×0.15 inches (15.2×15.2×0.38 cm), were compression molded from each composition for 5 minutes at 300° F. (149° C.) and 7,000 psig (48.3 MPa gage). Each plaque was then evaluated to determine its physical properties. The nature and quantity of each component used and physical properties determined are presented in Tables I and II. Microstructure of the polymers of conjugated dienes in Table I was normalized in consideration of styrene content. All of the ingredients in Table II are in parts by weight.

The physical properties were determined in accordance with the test procedures as follows:

Flexural modulus and flexural strength, ASTM D790.

Tensile and elongation, ASTM D256.

Shrinkage, ASTM D955.

Gloss, ASTM D523.

Average roughness, height in microns, was measured by a Bendix Profilometer, Type QBA, LX-6 tracer, FT Skidmount.

Reverse impact, height in inches, was determined by dropping a 0.6 lb. (277 g) dart with rounded tip on a plaque. Failure is indicated in inches at which a crack or cracks appear on the reverse side.

Carboxy content was determined by calculation based on the molecular weight and amount of $CO_2$ coupling agent used. The carboxy content of polymer G was also determined by titration with sodium methoxide using thymol blue indicator and the results correlated well with the calculated value.

Molecular weight was determined by [gas] *gel* permeation chromotography using THF as the solvent.

TABLE 1

| Polymer of Conjugated Diene Characteristics | | | | | | |
|---|---|---|---|---|---|---|
| Polymer | Wt. % $CO_2H$ | Microstructure % Vinyl/Trans/Cis | Butadiene Styrene | Inherent Viscosity | Molecular Weight Wt. Avg. | Molecular Weight No. Avg. |
| A[a] | 0 | 9/53/38 | 75/25 | 0.95 | 83,000 | 68,000 |
| B[b] | 0 | 11/55/34 | 52/48 | 1.12 | 101,000 | 57,000 |
| C[c] | 0 | 10/45/45 | 60/40 | 0.77 | 160,000 | 120,000 |
| D[d] | 0 | — | 70/30 | 1.12 | 128,000 | 113,000 |
| E[e] | 0.035 | — | 70/30 | 1.21 | 154,000 | 125,000 |
| F[f] | 0 | — | 70/30 | 1.77 | 256,000 | 209,000 |
| G[g] | 0.26 | 61/17/22 | 100/0 | 0.36 | 23,800 | 18,100 |
| H[h] | 0.02 | 11/47/42 | 71/29 | 1.52 | 177,000 | 119,000 |
| I[i] | 0.025 | 75/8/17 | 71/29 | 1.11 | 172,000 | 130,000 |
| J[j] | — | — | — | — | — | — |

[a]Solprene 1205 block copolymer.
[b]Solprene 410 block copolymer.
[c]Solprene 414 radial block copolymer.
[d]Linear styrene-butadiene block copolymer.
[e]Butadiene-styrene carboxy-terminated block copolymer containing less than 10% styrene-butadiene X butadiene-styrene linear block copolymer where X is a coupling agent, the coupled polymer being produced as the carboxy-terminated polymer is formed.
[f]Linear styrene-butadiene-styrene block copolymer.
[g]$CO_2H$ terminated polybutadiene.
[h]A mixture of polymers consisting of about 48 wt. % styrene-butadiene block polymer of about a wt. average molecular weight of 100,000 containing the $CO_2H$ end groups, about 46 wt. % styrene-butadiene X butadiene-styrene linear block copolymer of about 200,000 wt. average molecular weight and about 6 wt. % polystyrene of about 6,000 wt. average molecular weight ($CO_2H$ terminated).
[i]Block copolymer, $CO_2H$ terminated, 30% coupled similar to polymer H.
[j]Commercially available polyvinyl acetate based product for use in polyester formulations from Union Carbide.

TABLE II

| Run Number | 1 | 2 | 3 | 4 | 5 | 6 | 7 | 8 | 9 |
|---|---|---|---|---|---|---|---|---|---|
| Polymer J | 0 | 0 | 16 | 0 | 0 | 0 | 0 | 0 | 0 |
| Polymer A | 0 | 0 | 0 | 26 | 0 | 0 | 0 | 0 | 0 |
| Polymer B | 0 | 0 | 0 | 0 | 25 | 25 | 26 | 0 | 0 |
| Polymer C | 0 | 0 | 0 | 0 | 0 | 0 | 0 | 25 | 0 |
| Polymer D | 0 | 0 | 0 | 0 | 0 | 0 | 0 | 0 | 26 |
| Polymer E (0.035% COOH) | 0 | 0 | 0 | 0 | 0 | 0 | 0 | 0 | 0 |
| Polymer F | 0 | 0 | 0 | 0 | 0 | 0 | 0 | 0 | 0 |
| Polymer G (0.26% COOH) | 0 | 0 | 0 | 0 | 0 | 0 | 0 | 0 | 0 |
| Polymer H (0.02% COOH) | 0 | 0 | 0 | 0 | 0 | 0 | 0 | 0 | 0 |
| Polymer I (0.025% COOH) | 0 | 0 | 0 | 0 | 0 | 0 | 0 | 0 | 0 |
| Styrene monomer | 34 | 34 | 40 | 51 | 53 | 53 | 51 | 56 | 75 |
| Polyester resin | 66 | 66 | 40 | 49 | 50 | 50 | 49 | 50 | 49 |
| Calcium carbonate | 300 | 300 | 300 | 370 | 376 | 376 | 370 | 376 | 368 |
| Zinc stearate | 3.5 | 3.5 | 3.5 | 4.3 | 4.4 | 4.4 | 4.3 | 4.4 | 4.3 |
| Magnesium hydroxide | 1.9 | 1.9 | 1.9 | 2.4 | 0 | 0 | 2.4 | 2.4 | 2.4 |
| t-butyl perbenzoate | 0.94 | 0.95 | 0.94 | 1.2 | 1.2 | 1.2 | 1.2 | 1.2 | 1.2 |
| ¼" glass fiber | 71 | 71 | 70 | 87 | 125 | 125 | 87 | 88 | 86 |
| Days molded after compounding | 5 | 0 | 0 | 0 | 0 | 4 | 7 | 0 | 7 |
| Flexural modulus, psi × 10 | 2,220 | 2,080 | 1,860 | 1,640 | 1,740 | 1,720 | nd | 1,720 | 1,310 |
| Flexural strength, psi | 15,700 | 13,800 | 10,500 | 12,200 | 10,600 | 10,300 | nd | 11,300 | 10,800 |
| Tensile break psi | 4,230 | 3,980 | 4,720 | 5,020 | [75,790] 5590 | 3,490 | nd | 6,660 | 4,130 |
| Elongation, % | 1 | 2 | 2 | 2 | 3 | 2 | nd | 3 | 2 |
| Notched Izod impact, ft. lbs/in. | 3.5 | 2.3 | 2.4 | 2.9 | 0.95 | 1.0 | nd | 2.6 | 2.4 |
| Unnotched Izod impact, ft. lbs/in. | 4.4 | 4.1 | 4.4 | 4.0 | 1.9 | 2.8 | nd | 3.4 | 4.4 |
| Reverse impact, inches (0.6 lb. dart) | 4 | <3 | 3-6[a] | <3 | nd | nd | 6 | <3 | 3.5 |

TABLE II-continued

| | | | | | | | | | |
|---|---|---|---|---|---|---|---|---|---|
| Shore D Hardness | 92 | 95 | 90 | 90 | nd | nd | nd | 90 | 90 |
| Average roughness, microns | 0.22 | 0.46 | 0.45 | 0.74 | 0.40 | 0.55 | nd | 1.1 | 0.45 |
| Shrinkage, mil/inch | 3 | 3 | −0.2 | 0 | −0.8 | −0.3 | nd | −0.1 | 0.3 |
| Gloss, % at 60° angle | nd | 60 | 28 | nd | nd | nd | nd | 19 | 19 |
| Density, g/cc | nd | 2.1 | 2.0 | 2.0 | nd | nd | nd | 1.9 | nd |
| Remarks | Control | Control | Control | Control | Control | Control | Control | Control | Control |
| **Run Number** | **10** | **11** | **12** | **13** | **14** | **15** | **16** | **17** | **18** |
| Polymer J | 0 | 0 | 0 | 0 | 0 | 0 | 0 | 0 | 0 |
| Polymer A | 0 | 0 | 0 | 0 | 0 | 0 | 0 | 0 | 0 |
| Polymer B | 0 | 0 | 0 | 0 | 0 | 13 | 0 | 0 | 0 |
| Polymer C | 0 | 0 | 0 | 0 | 0 | 0 | 0 | 0 | 0 |
| Polymer D | 0 | 0 | 13 | 0 | 0 | 0 | 0 | 0 | 0 |
| Polymer E (0.035% COOH) | 26 | 0 | 0 | 13 | 0 | 0 | 0 | 0 | 0 |
| Polymer F | 0 | 26 | 13 | 13 | 0 | 0 | 0 | 0 | 0 |
| Polymer G (0.26% COOH-Low MW) | 0 | 0 | 0 | 0 | 25 | 13 | 0 | 0 | 0 |
| Polymer H (0.02% COOH) | 0 | 0 | 0 | 0 | 0 | 0 | 25 | 25 | 0 |
| Polymer I (0.025% COOH) | 0 | 0 | 0 | 0 | 0 | 0 | 0 | 0 | 25 |
| Styrene monomer | 75 | 75 | 75 | 75 | 57 | 75 | 73 | 78 | 56 |
| Polyester resin | 49 | 49 | 49 | 49 | 50 | 49 | 50 | 50 | 50 |
| Calcium carbonate | 368 | 368 | 368 | 368 | 374 | 368 | 282 | 376 | 376 |
| Zinc stearate | 4.3 | 4.3 | 4.3 | 4.3 | 4.4 | 4.3 | 4.5 | 4.4 | 4.5 |
| Magnesium hydroxide | 2.4 | 2.4 | 2.4 | 2.4 | 2.4 | 2.4 | 2.4 | 2.4 | 2.4 |
| t-butyl perbenzoate | 1.2 | 1.2 | 1.2 | 1.2 | 1.2 | 1.2 | 1.3 | 1.2 | 1.2 |
| ¼" glass fiber | 86 | 86 | 86 | 86 | 88 | 86 | 88 | 88 | 88 |
| Days molded after compounding | 7 | 7 | 7 | 7 | 6 | 7 | 6 | 0 | 0 |
| Flexural modulus, psi × 10 | 1,070 | 1,150 | 1,190 | 1,080 | 1,420 | 1,230 | 1,030 | 1,230 | 1,640 |
| Flexural strength, psi | 13,100 | 9,980 | 11,200 | 11,800 | 13,400 | 12,900 | 12,500 | 14,500 | 11,300 |
| Tensile break psi | 7,280 | 4,270 | 5,570 | 6,000 | 3,830 | 4,890 | 8,090 | 6,710 | 5,300 |
| Elongation, % | 4 | 2 | 3 | 3 | 2 | 3 | 4 | 3 | 3 |
| Notched Izod impact, ft. lbs/in. | 2.6 | 2.9 | 3.6 | 3.6 | 3.4 | 3.3 | 2.5 | 2.6 | 4.4 |
| Unnotched Izod impact, ft. lbs/in. | 4.1 | 4.1 | 6.5 | 5.2 | 4.5 | 4.9 | 3.9 | 4.5 | 6.6 |
| Reverse impact, inches (0.6 lb. dart) | 14 | 8 | 5 | 10 | 11 | 10 | 7 | 12 | 6–12[b] |
| Shore D Hardness | 88 | 90 | 90 | 89 | nd | 90 | nd | 90 | 90 |
| Average roughness, microns | 0.25 | 0.35 | 0.35 | 0.28 | 1.9 | 1.5 | 0.32 | 0.42 | 0.43 |
| Shrinkage, mil/inch | 0.2 | 0.2 | 0.4 | 0.4 | −0.2 | −0.4 | −0.1 | −0.1 | 0 |
| Gloss, % at 60° angle | 56 | 30 | 24 | 45 | nd | 23 | nd | 82 | 78 |
| Density, g/cc | nd | nd | nd | nd | nd | nd | nd | 1.9 | 2.0 |
| Remarks | Invention | Control | Control | Invention | Control | Control | Invention | Invention | Invention |

[a]Broke at 6 inches, did not break at 3. Rerun showed actual value to be 4 after 6 days aging.
[b]Broke at 12, did not break at 6. Rerun showed actual value to be 9 after 4 days aging.

Inspection of the data presented in Table II shows that polyester compositions in the absence of a polymeric modifier as in control runs 1 and 2 yield relatively hard, brittle molded plaques with poor reverse impact values of about 4 inches. The composition of control run 1 was allowed to mature 5 days at room temperature before molding. Experience has shown such a maturation period is desirable to obtain the maximum physical properties and this feature is observed in the poorer properties shown in run 2. Control run 3 shows that LP-40A (a commercial polyvinyl acetate product) included in the composition gives a molded product having a reverse impact value of up to about 6 inches. However, compared with run 2, gloss is impaired and flexural strength is somewhat decreased. The effect of adding various butadiene-styrene copolymers is shown in control runs 4–9. The results obtained are about the same as those obtained in control run 3. The increase in reverse impact strength with the addition of carboxy-terminated normally solid polymers of conjugated dienes is shown in invention runs 10, 13, 16, 17 and 18 and such other physical properties as flexural strength, elongation, gloss and surface roughness (when determined) are also considered to be satisfactory. Invention run 13 shows that the carboxy-terminated polymers can be admixed with up to about 50 weight percent of a non-carboxy rubber, such as a linear block copolymer or a radial block copolymer and still obtain compositions exhibiting a good balance of physical properties. The relatively good reverse impact of control run 11 represents an anomalous result but in any event the gloss is poor. Admixing a linear block (i.e. ABA) polymer with a linear AB block polymer as in the run 12 composition gives a reverse impact value about the same as in the other control runs. Control runs 14 and 15 show that while good reverse impact can be obtained with low molecular weight carboxy terminated polymer, the compositions are unsatisfactory because of high surface roughness. Invention run 16 has a reverse impact strength of 7 at a low loading of calcium carbonate. At the same low loading of calcium carbonate a control run made without the normally solid carboxy-containing polymer of a conjugated diene had a reverse impact strength of 3.5 inches.

A visual examination of the molded plaques of the invention showed uniform pigmentation compared with a mottled appearance of the sample using the commercial polyvinyl acetate modifier (run 3).

While this invention has been described in detail for the purpose of illustration it is not to be construed as limited thereby but is intended to cover all changes and modifications within the spirit and scope thereof.

What is claimed is:

1. A *cured thermoset article produced by subjecting to heat a thermosetting* composition comprising:

a. an unsaturated polyester prepared by reacting an unsaturated dicarboxylic acid and a polyol;

b. *a diene component consisting essentially of* a normally solid carboxy-containing polymer of a conjugated diene having a weight average molecular weight within the range of [30,000] *50,000* to [400,000] *250,000 and wherein said carboxy-con-*

*taining polymer has a polymerized conjugated diene content of from 55 to 100 weight percent;* c. a vinyl monomer;

d. a catalyst; and e. [at least one of] a *fibrous* reinforcing agent [or a filler].

2. [A composition] *An article* according to claim 1 wherein said polymer of a conjugated diene has [a weight average molecular weight within the range of 50,000 to 250,000 and] an inherent viscosity within the range of 0.6 to 2.

3. [A composition] *An article* according to claim 1 wherein said polymer of a conjugated diene is a copolymer of butadiene and styrene.

4. [A composition] *An article* according to claim 1 wherein said polyester is prepared by reacting fumaric acid and propylene glycol.

5. [A composition] *An article* according to claim 1 wherein said vinyl monomer is styrene.

6. [A composition] *An article* according to claim 1 wherein a ratio of (a) to (b) is within the range of 5:1 to 1:1 and wherein said vinyl monomer is present in an amount within the range of 30 to 200 parts by weight per 100 parts by weight of (a) plus (b).

7. [A composition] *An article* according to claim 1 wherein said catalyst is a peroxide *and said composition contains in addition a lubricant and a thickener.*

8. [A composition] *An article* according to claim 1 [containing] *wherein said fibrous reinforcing agent is composed of* glass fibers and *wherein said composition contains in addition* calcium carbonate.

9. [A composition] *An article* according to claim 1 wherein said unsaturated polyester is produced by reacting fumaric acid and propylene glycol, said normally solid carboxy-containing polymer is a copolymer of butadiene and styrene characterized by a vinyl addition of 5 to 76 percent and having 0.01 to 5 weight percent carboxyl content, said vinyl monomer is styrene, a ratio of (a) to (b) being within the range of 5:1 to 1:1, said vinyl monomer is present in an amount within the range of 30 to 200 parts by weight per 100 parts by weight of (a) plus (b), said catalyst is tertiary butyl perbenzoate present in an amount within the range of 1–5 parts by weight per 100 parts by weight of (a) plus (b), *said fibrous reinforcing agent is composed of glass fibers present in an amount within the range of 40 to 200 parts by weight per 100 parts by weight of (a) plus (b)* and wherein said composition contains calcium carbonate filler in an amount within the range of 200 to 800 parts by weight of filler per 100 parts [per] *by* weight of (a) plus (b), [glass fiber reinforcing agent in an amount within the range of 40 to 200 parts by weight per 100 parts by weight of (a) plus (b),] 1 to 15 parts by weight of zinc stearate per 100 parts by weight of (a) plus (b) and 1 to 10 parts by weight of magnesium hydroxide per 100 parts by weight of (a) plus (b).

[10. A cured article produced by subjecting the composition of claim 9 to heat.]

[11. A cured article produced by subjecting the composition of claim 1 to heat.]

12. A method of forming thermosetting compositions suitable for preparing reinforced plastic articles comprising milling together under conditions of moderate shear:

a. an unsaturated polyester prepared by reacting an unsaturated dicarboxylic acid and a polyol;

b. a normally solid carboxy-containing polymer of a conjugated diene having a weight average molecular weight within the range of 30,000 to 400,000;

c. a vinyl monomer;

d. a catalyst; and e. [at least one of] a *fibrous* reinforcing agent [or a filler].

13. A method according to claim 12 wherein said milling is done with a twin-rotor mixer using sigma blades.

14. A method according to claim 13 wherein said unsaturated polyester is produced by reacting fumaric acid and propylene glycol, said normally solid carboxy-containing polymer is a copolymer of butadiene and styrene characterized by a vinyl unsaturation of 5 to 76 percent and having 0.01 to 5 weight percent carboxyl content, said vinyl monomer is styrene, a ratio of (a) to (b) is within the range of 5:1 to 1:1, said vinyl monomer is present in an amount within the range of 30 to 200 parts by weight per [110] *100* parts by weight of (a) plus (b), said catalyst is tertiary butyl perbenzoate, *said fibrous reinforcing agent is composed of glass fibers present in an amount within the range of 40 to 200 parts by weight per 100 parts by weight of (a) plus (b)* and wherein said composition contains calcium carbonate filler in an amount within the range of 200 to 800 parts by weight of filler per 100 parts [per] *by* weight of (a) plus (b), [glass fiber reinforcing agent in an amount within the range of 40 to 200 parts by weight of (a) plus (b),] 1 to 15 parts by weight of a lubricant per 100 parts by weight of (a) plus (b) and 1 to 10 parts by weight of an oxide or hydroxide of a group II metal.

15. A method according to claim 13 wherein said shear produces a temperature rise of 2° to 30° C.

16. A method according to claim 12 wherein the resulting composition is subjected to curing conditions of 100° C. to 200° C. for a time within the range of 1 to 15 minutes.

*17. A composition consisting essentially of:*

*a. an unsaturated polyester prepared by reacting an unsaturated dicarboxylic acid and a polyol;*

*b. a normally solid carboxy-containing polymer of a conjugated diene having a weight average molecular weight within the range of 30,000 to 400,000 and wherein said carboxy-containing polymer has a polymerized conjugated diene content of from 55 to 100 weight percent;*

*c. a vinyl monomer;*

*d. a catalyst;*

*e. a fibrous reinforcing agent;*

*f. a lubricant selected from aluminum stearate, barium stearate, clacium stearate, magnesium stearate of zinc stearate;*

*g. a thickener selected from oxides and hydroxides of magnesium, calcium, strontium, barium and zinc; and*

*h. a filler.*

*18. A composition according to claim 17 wherein said unsaturated polyester is prepared by reacting fumaric acid and propylene glycol, said normally solid carboxy-containing polymer is a copolymer of butadiene and styrene characterized by a vinyl unsaturation of 5 to 76 percent and having 0.01 to 5 weight percent carboxyl content, said vinyl monomer is styrene, a ratio of (a) to (b) is within the range of 5:1 to 1:1, said vinyl monomer is present in an amount within the range of 30 to 200 parts by weight per 100 parts by weight of (a) plus (b), said catalyst is tertiary butyl perbenzoate present in an amount within the range of 1-5*

*parts by weight per 100 parts by weight of (a) plus (b), said fibrous reinforcing agent is composed of glass fibers present in an amount within the range of 40 to 200 parts by weight per 100 parts by weight of (a) plus (b), said lubricant is zinc stearate present in an amount within the range of 1-15 parts by weight per 100 parts by weight of (a) plus (b), said thickener is magnesium hydroxide present in an amount within the range of 1-10 parts by weight per 100 parts by weight of (a) plus (b) and said filler is calcium carbonate present in an amount within the range of 200 to 800 parts by weight per 100 parts by weight of (a) plus (b).*

* * * * *

UNITED STATES PATENT AND TRADEMARK OFFICE

CERTIFICATE OF CORRECTION

PATENT NO. : Re. 31,436

DATED : November 1, 1983

INVENTOR(S) : Aubrey South, Jr.

It is certified that error appears in the above-identified patent and that said Letters Patent are hereby corrected as shown below:

Column 10, line 52, claim 17, line 14, after "stearate",

"of" should be --- or ---.

Signed and Sealed this

*Twenty-third* Day of *October 1984*

[SEAL]

*Attest:*

GERALD J. MOSSINGHOFF

*Attesting Officer*

*Commissioner of Patents and Trademarks*